US012338583B2

(12) United States Patent
Savoyat

(10) Patent No.: US 12,338,583 B2
(45) Date of Patent: Jun. 24, 2025

(54) MOBILE DEVICE FOR HEATING A RAIL OF A PERMANENT WAY USING INFRARED-RADIATION ELECTRIC LAMPS, AND ASSOCIATED HEATING METHOD

(71) Applicant: MATISA MATERIEL INDUSTRIEL S.A., Crissier (CH)

(72) Inventor: Marc-Antoine Savoyat, Renens (FR)

(73) Assignee: MATISA MATERIAL INDUSTRIEL S.A., Crissier (CH)

(*) Notice: Subject to any disclaimer, the term of this patent is extended or adjusted under 35 U.S.C. 154(b) by 921 days.

(21) Appl. No.: 17/432,781

(22) PCT Filed: Jan. 30, 2020

(86) PCT No.: PCT/EP2020/052352
§ 371 (c)(1),
(2) Date: Aug. 20, 2021

(87) PCT Pub. No.: WO2020/169319
PCT Pub. Date: Aug. 27, 2020

(65) Prior Publication Data

US 2022/0042251 A1 Feb. 10, 2022

(30) Foreign Application Priority Data

Feb. 21, 2019 (FR) ........................................ 1901736

(51) Int. Cl.
*E01B 31/18* (2006.01)

(52) U.S. Cl.
CPC ........ *E01B 31/18* (2013.01); *H05B 2203/032* (2013.01)

(58) Field of Classification Search
CPC ................................................ H05B 2203/032
See application file for complete search history.

(56) References Cited

U.S. PATENT DOCUMENTS 3,566,796 A * 3/1971 Herrick .................. E01B 31/18 104/2
4,860,727 A * 8/1989 Eads ...................... E01B 19/00 126/271.2 A (Continued)

FOREIGN PATENT DOCUMENTS

| | | |
|---|---|---|
| EP | 0668398 | 8/1995 |
| JP | S61 67719 | 4/1986 |
| WO | WO 2018/215356 | 11/2018 |

OTHER PUBLICATIONS

PCT/EP2020/052352, Apr. 22, 2020, International Search Report and Written Opinion.

*Primary Examiner* — Robert J McCarry, Jr.
(74) *Attorney, Agent, or Firm* — RAY QUINNEY & NEBEKER P.C.; Paul N. Taylor

(57) ABSTRACT

A mobile device for heating a rail (12) of a railroad (2) is made up of a heating module (34) comprising at least one heating zone (28) and at least one radiating heat source (46) directed towards the heating zone (28), and of a transport vehicle (16) for transporting the heating module (34). A heating unit (36) of the heating module (34) comprises infrared-radiation electric lamps (42) able to emit radiation that is concentrated in the near-infrared, and which are equipped with a primary reflector (48) oriented in such a way as to reflect the infrared radiation emitted by the radiation source (46) towards the heating zone (28). The heating unit (36) also comprises a secondary reflector (50) having a concave reflective surface surrounding the heating zone (28) and able to return towards the heating zone (28) rays reflected by the rail and that pass between the infrared-radiation electric lamps (42).

22 Claims, 3 Drawing Sheets

(56) References Cited

U.S. PATENT DOCUMENTS

| | | | | |
|---|---|---|---|---|
| 5,237,143 | A * | 8/1993 | Scheuchzer | E01B 29/17 104/5 |
| 6,308,635 | B1 | 10/2001 | Abele | |
| 7,570,875 | B1 * | 8/2009 | Groves | F26B 3/283 219/405 |
| 8,463,115 | B1 * | 6/2013 | Groves | F26B 13/001 219/229 |
| 9,635,713 | B2 * | 4/2017 | Groves | F26B 13/001 |

* cited by examiner

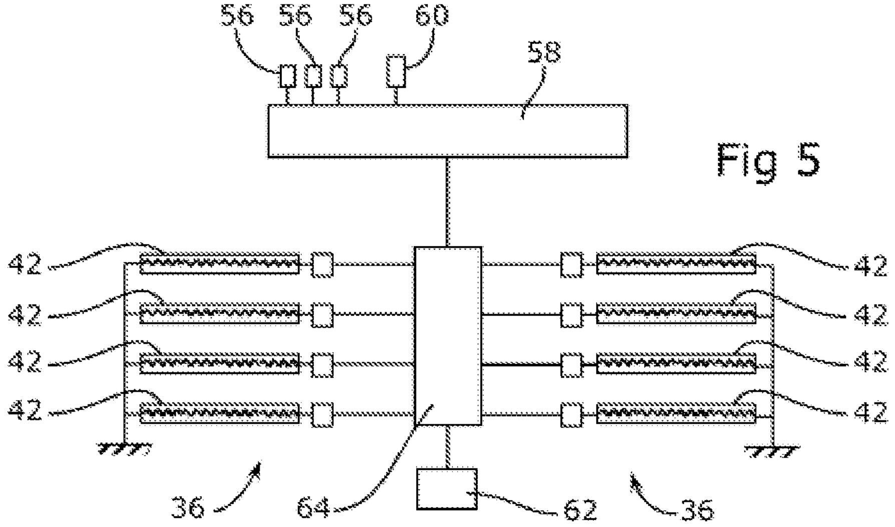
Fig 5
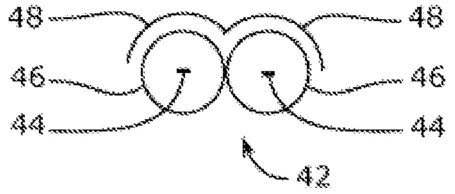
Fig 6
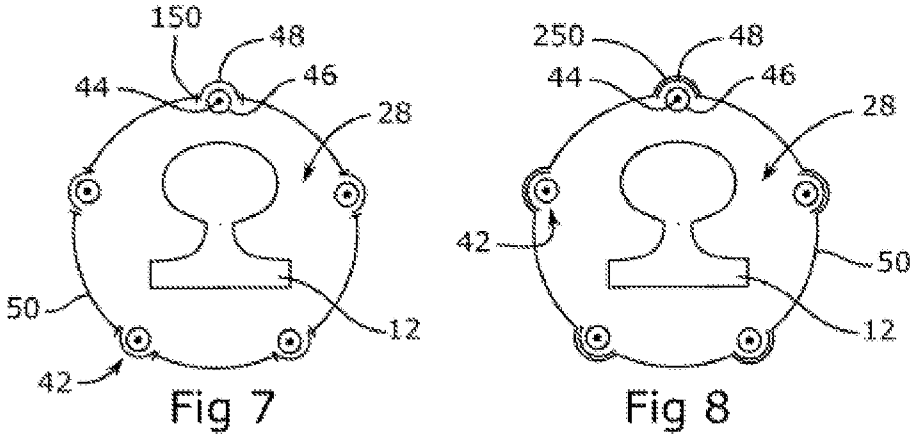
Fig 7
Fig 8

MOBILE DEVICE FOR HEATING A RAIL OF A PERMANENT WAY USING INFRARED-RADIATION ELECTRIC LAMPS, AND ASSOCIATED HEATING METHOD

TECHNICAL FIELD OF THE INVENTION

The invention relates to heating a rail of a railroad track, with the aim of neutralizing or pre-neutralizing said rail prior to fixing it to a railroad crosstie. It relates both to a mobile heating device which moves along the track, and to a laying method including heating of the rail.

PRIOR ART

The rails of railroad tracks are subjected to significant temperature variations depending on the seasons and the meteorological conditions. The rails tend to extend and expand under the effect of an increase in temperature, and, vice versa, to contract under the effect of a drop in temperature.

In the past, expansion joints were provided between successive rails of a line of railroad rails. Nowadays, the rails are welded end-to-end over very significant lengths, and thus fixed on the track crossties. Under the effect of an ambient temperature that is above the annual average, the rails, unable to expand, are subjected to a compression force, while the crossties are subjected to forces which tend to move them apart from one another. Vice versa, under the effect of an ambient temperature that is below the annual average, the rails, unable to contract, are subjected to a tractive force, while the crossties are subjected to forces which tend to move them towards one another.

When the temperature of the rail is not controlled during laying, it is necessary to proceed to operations referred to as mechanical "neutralization" following laying, and to limit the travel speed as long as these operations are not finalized. The mechanical neutralization consists in cutting a section of rail, the thickness of which depends on a difference identified between the temperature at the time of the intervention and the "neutral" temperature of the location, in dismantling the rail, and in stretching it using a rail stretcher in order to fill the space left by the cut section, prior to re-bolting and, if applicable, resoldering, the rail. As long as this neutralization operation has not taken place, the travel speed on the track must be limited, usually to 50 km/h. It will be understood that such organization of the works causes significant disruption to the traffic, both during the neutralization operation and during the preceding phase, between laying of the rail and neutralization.

Direct fixing of rails continuously heated to a value close to or equal to the "neutral" temperature makes it possible to achieve better results in terms of minimizing the traffic disruption. An operation of this kind is referred to as thermal neutralization.

A solution of continuous heating of the rails, carried out hitherto, requires induction technology. Said method makes it possible to achieve heating that is sufficiently precise to ensure that the rails are laid within the tolerance required by the "neutral" temperature. It is thus possible to refer to direct fine thermal neutralization. However, the material required for the operation is relatively complex, since it requires a power generator as well as cooling of the power circuits, the generator, and the inductor.

For sites requiring subsequent stabilization of the ballast, a thermal "pre-neutralization" process has been proposed, which consists in bringing the rail, prior to fixing it to the crossties, to a temperature sufficiently close to the "neutral" temperature of the location, without, however, guaranteeing that the "neutral" temperature will be reached. Such "pre-neutralization" is of interest in that it immediately allows travel at a speed in the region of 80 km/h rather than 50 km/h, while awaiting the final mechanical neutralization operations described above. A method for carrying out said thermal pre-neutralization consists in spraying the rails with hot water: a simple solution but one which nonetheless has disadvantages in use, in particular in terms of the output, delivery and drainage of the water, which renders it of less interest.

Furthermore, U.S. Pat. No. 6,308,635 has proposed heating the rail that is already laid on the ground, using an electric radiant heating module comprising silicon carbide electrical heating elements, each associated with a dedicated parabolic reflector. However, the performance of a device of this kind has not yet been documented.

DISCLOSURE OF THE INVENTION

The invention aims to overcome the disadvantages of the prior art, and to propose a heating mode which is powerful, precise in terms of amount of heat transmitted, and reactive in the transitory periods of change in laying speed or change in ambient temperature.

In order to achieve this, according to a first aspect of the invention a mobile device for heating a rail of a railroad track is proposed, comprising: at least one heating module comprising at least one heating zone and at least one radiating heat source which is oriented towards the heating zone; and a transport vehicle for transporting the heating module, which is capable of travelling along a railroad track in a laying direction, such that, at each moment, a portion of a rail of the railroad track which is not fixed to a crosstie of the railroad track passes through the heating zone, in an advance direction. In a characteristic manner, the heating module comprises at least one heating unit, the heating unit comprising a plurality of infrared radiation electric lamps which are distributed over the periphery of the heating zone and are oriented towards the heating zone, each of the infrared radiation electric lamps comprising at least one radiation source which is capable of emitting infrared radiation having a maximum power spectral density for a wavelength of less than 2 μm, preferably less than 1.4 μm, very preferably less than 1.2 μm, and at least one primary reflector which is oriented so as to reflect the infrared radiation emitted by the radiation source towards the heating zone, the radiation source being arranged between the primary reflector and the heating zone, directly opposite the heating zone, the heating unit further comprising a secondary reflector having a concave reflective surface surrounding the heating zone and capable of returning reflected rays, passing between the infrared radiation electric lamps, towards the heating zone.

A steel railroad rail has an absorbency which increases when the wavelength reduces, at least for the wavelengths of greater than 0.5 μm. Selecting infrared lamps of which the radiation peak is located in the near infrared range (in particular IR-A or NIR) achieves a better absorption than for lamps emitting in mid or far infrared.

The presence of individual primary reflectors and a common secondary reflector makes it possible to considerably increase the output, returning towards the rail the radiation reflected thereby.

Indeed, a portion of the radiation that is incident on the rail is reflected thereby. This is true in particular for the underneath of the rail, which is bright and for which the rate of reflection may reach 65%. The primary reflector integrated in each infrared lamp is primarily intended for directing the radiation, emitted by the lamp, towards the rail, but it also functions as a secondary reflector for redirecting, towards the rail, the radiation which the rail has previously reflected. The common secondary reflector completes the action of the primary reflectors to redirect, towards the rail, the radiation which has not been absorbed. This provision makes it possible to achieve a very good output using lamps which are not joined.

The near infrared radiation electric lamps have an extremely rapid response time compared with the speed of advancement of the railroad laying work, which makes it possible to envisage not only pre-neutralization operations, but also fine neutralization operations.

According to one embodiment, there is at least one point of the heating zone which is located at a distance of less than 160 mm, and preferably less than 120 mm, from the radiation source of each of the infrared radiation electric lamps.

According to one embodiment, there is at least one point of the heating zone which is located at a distance of less than 160 mm, and preferably less than 120 mm, from any point of the reflective surface of the secondary reflector.

According to one embodiment, at least some of the lamps are distributed so as to be spaced apart from one another, over the periphery of the heating zone. According to one embodiment, at least some of the infrared radiation electric lamps are joined in pairs.

In order to limit the losses, the secondary reflector must preferably maximally surround the rail that is positioned in the center of the heating zone. It is thus preferably possible to provide that, in a cross section through a plane perpendicular to the advance direction, the reflective surface of the secondary reflector has a cross section in the shape of a circular arc having an angle of more than 180°, preferably more than 240°, or a circular cross section. In a cross section through a plane perpendicular to the advance direction, the reflective surface of the secondary reflector preferably has a radius of curvature that is less than 160 mm, preferably less than 120 mm, and greater than 70 mm, preferably greater than 100 mm.

The reflective surface of the secondary reflector must preferably exhibit significant reflectance in the spectral region considered. In practice, a reflective surface is preferably selected which has a reflectance of greater than 80% in the spectral range of between 0.5 and 2 μm, which can be achieved at a reasonable cost, in particular in the case of a surface made of polished aluminum or, if applicable, in the case of a silver or gold surface.

In a similar manner, there is an interest in the reflectance of the primary reflectors being very high, preferably greater than 90%, in the spectral range of between 0.5 and 2 μm. The primary reflector of each of the infrared radiation electric lamps is preferably made of silver or gold.

In order to achieve an optimal redirection of the flux emitted by each radiation source towards the heating zone, the primary reflector of each of the infrared radiation electric lamps is parabolic or in the shape of an elliptical or circular arc in a cross section in accordance with a sectional plane perpendicular to the advance direction. The radiation source is preferably located in the region of a focus of the parabola or of the ellipse or of the center of the circular arc.

In practice, the maximum power spectral density is observed for a wavelength of greater than 0.7 μm. It is in particular possible to select, as a radiation source, incandescent halogen lamps which emit in near infrared.

It is preferable for the number of infrared radiation electric lamps to be greater than 2, preferably greater than 4.

According to an embodiment that is particularly simple to implement, the secondary reflector surrounds the infrared radiation electric lamps. The secondary reflector can thus be formed by a single piece, without cutouts.

Alternatively, it is possible to provide for the secondary reflector to extend between the infrared radiation electric lamps. In this case, it is necessary to provide cutouts or stampings in the secondary reflector for accommodating the infrared radiation electric lamps.

The transport vehicle of the heating module preferably comprises means for raising the portion of the rail located in the heating zone with respect to the railroad track, and means for positioning the portion of the rail, following heat input, on a crosstie of the railroad track and for fixing the portion of the rail on the crosstie.

The transport vehicle of the heating module preferably comprises means for raising the portion of the rail located in the heating zone with respect to the track, and means for positioning the portion of the rail, following heat input, on a crosstie before fixing the portion of the rail on the crosstie. As has been stated above, the upraising of the portion of the rail in the heating zone makes it possible to better surround the rail while heating it, not only from above, but also from the sides and, if applicable, from below, in order to make the heat input over the periphery of the portion of the rail uniform, and to minimize the losses. The fact that the heating zone is remote from the track, and in particular the crossties, makes it possible, if applicable, to use an increased heating power, without any risk for the track.

According to one embodiment, the heating module comprises at least two heating units which are aligned in the advance direction in order to define the heating zone. The heating module is preferably provided with guide means for ensuring the guidance of the portion of the rail in the heating zone of the guided heating module, the guide means preferably comprising rollers which roll on the portion of the rail.

Of course, the heating power must be modulated depending on the external conditions, in order to achieve a desired setpoint temperature for the rail.

According to one embodiment, the plurality of infrared radiation electric lamps comprises at least two infrared radiation electric lamps, preferably at least four infrared radiation electric lamps, and particularly preferably more.

If applicable, it is possible to modulate the number of activated infrared radiation electric lamps, depending on one or more control parameters.

The control parameter or parameters preferably include one or more of the following measured or estimated parameters: a temperature of the portion of the rail before heating, a temperature of the portion of the rail after heating, a temperature of the portion of the rail during heating, an outside ambient temperature, a movement speed of the transport vehicle of the heating module, a movement speed of the rail with respect to the heating device, a duration of heating, a deviation between a setpoint temperature and a measured temperature of the portion of the rail before heating, a deviation between a setpoint temperature and a measured temperature of the portion of the rail after heating, a deviation between a setpoint temperature and a measured temperature of the portion of the rail during the heat input, an ambient humidity, or a wind speed. It is possible in particular to provide one or more of the following procedures:

at least one temperature of the portion of the rail is measured after the heat input, by means of a temperature sensor arranged in the region of an outlet zone of the heating zone or behind the heating zone in the laying direction;

at least one temperature of the portion of the rail is measured before the heat input, by means of a temperature sensor arranged in the region of an inlet zone of the heating zone or in front of the heating zone in the laying direction;

at least one temperature of the portion of the rail is measured during the heat input, by means of a temperature sensor arranged inside the heating zone.

In order to achieve reproducible positioning of the portion of the rail to be fixed, passing through the heating zone, it is possible in particular to provide one or more of the following procedures:

the portion of the rail is guided with respect to a chassis frame of the transport vehicle of the heating module, such that the portion of the rail passes through the heating zone during movement of the transport vehicle of the heating module.

the heating module is guided with respect to a chassis frame of the transport vehicle of the heating module, such that the portion of the rail passes through the heating zone during movement of the transport vehicle of the heating module.

the heating module is guided with respect to the portion of the rail, preferably causing the heating module to roll on the portion of the rail, such that the portion of the rail passes through the heating zone during movement of the transport vehicle of the heating module.

According to one embodiment, the movement of the transport vehicle of the heating module in the laying direction takes place without stopping.

The invention can in particular be implemented for first laying of a new track, or for renewal or renovation.

BRIEF DESCRIPTION OF THE FIGURES

Other features and advantages of the invention will become clear from the following description, given with reference to the accompanying drawings, in which:

FIG. 5: is a schematic view showing control of the heating module of FIGS. 3 and 4;

FIG. 6: is a schematic front view of an infrared radiation lamp of a heating module according to a first variant;

FIG. 7: is a schematic front view of a heating module according to a second variant;

FIG. 8: is a schematic front view of a heating module according to a third variant.

For reasons of improved clarity, identical or similar elements are indicated by identical reference signs in all the figures.

DETAILED DESCRIPTION OF EMBODIMENTS

Figure 1:
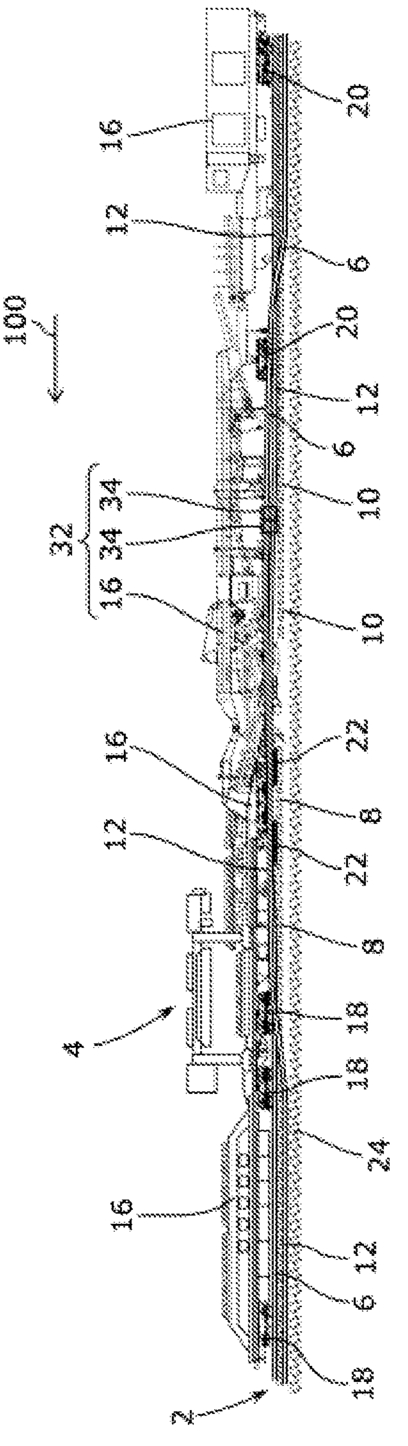
FIG. 1: is a schematic view of a site for laying a rail of a railroad track, using a heating device according to the invention.

FIG. 1 is a global view of a site for replacing a railroad track 2, in which, by means of a work train 4 (shown in part), old rails 6 (front sector) and old crossties 8 are deposited and are replaced by new crossties 10 and new rails 12, all this being carried out continuously as the train advances in a work direction 100. The work train 4 comprises wagons 16 resting on bogies 18, 20 which roll on the old rails 6 in the front part of the work train 4 and on the new rails 12 in the rear part of the work train 4. A mid-part of the work train 4 in turn rests on caterpillar tracks 22 which, in the absence of rails on the track 2 in this part of the site, roll directly on the old crossties 8 before they are deposited.

On a front portion of the site, tools make it possible to separate the old rails 6 from the crossties 8. Gradually, during their disassembly, the old rails 6 are raised and placed down on the ballast 24 on the sides of the track. On the front portion of the site, the old crossties 8 are exposed, which makes it possible to continue to the deposition thereof by means of a group of deposition tools, and to the replacement thereof by the new crossties 10 by means of a group of laying tools. The new rails 12 which, prior to the passage of the work train 4, were arranged on the ground on either side of the track 2, are raised and positioned, adhering to the desired geometry of the track 2, before being laid on the new crossties 10. The final fixing of the new rails 12 is carried out using ties, after the work train 4 has passed.

In order to prevent or limit the risk of deterioration of the track which may be caused by the dimensional variations of the rails 12 under the effect of more severe climatic or meteorological conditions, it is provided for the new or restored rails 12 to be finally fixed on the crossties, by bringing said metal profiles to an average temperature of the laying location, referred to as "pre-neutralization" or "neutralization."

For this purpose, the portion of new or restored rail to be laid 12 is brought to a setpoint temperature in a thermal conditioning zone 28 located upstream of and close to the fixing zone 30 of said portion of rail on one or more crossties 10. When the intervention on the site takes place at a moment when the ambient temperature is lower than the setpoint temperature referred to as "pre-neutralization" or "neutralization," this regulation comprises heating of the rail, the thermal conditioning zone 28 thus being a heating zone.

Figure 2:
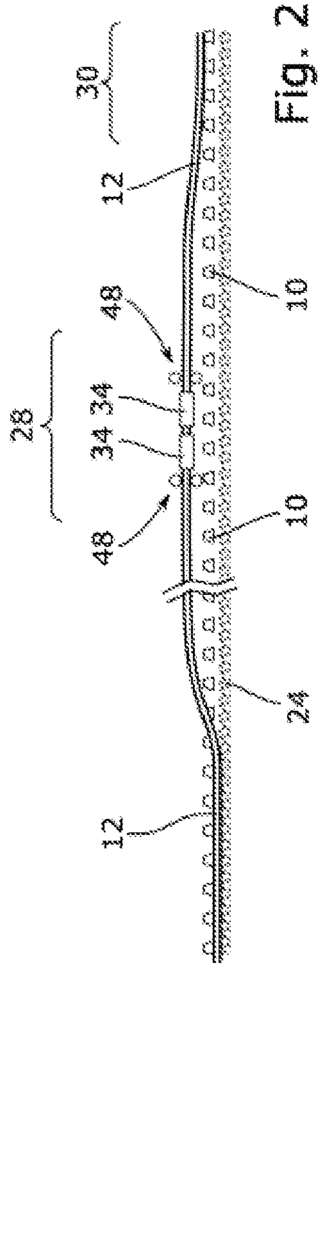
FIG. 2: is a schematic detailed view of the site of FIG. 1, showing the heating of a rail to be fixed, using the heating device of the invention.
Figure 3:
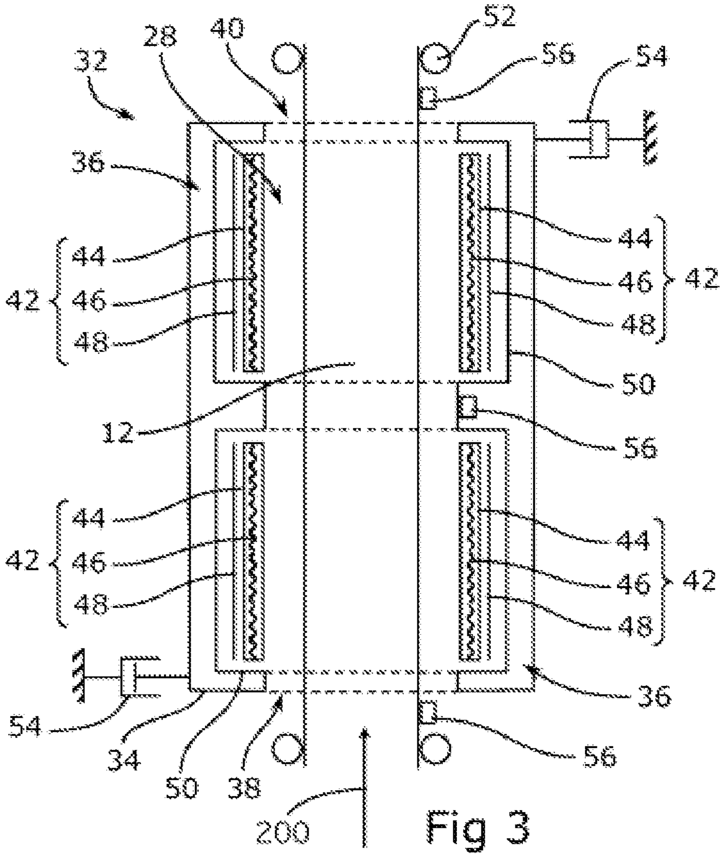
FIG. 3: is a schematic view from below of a heating module of a heating device according to the invention.
Figure 4:
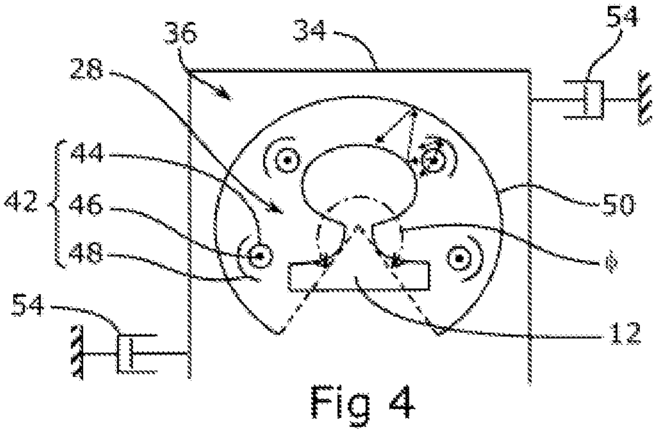
FIG. 4: is a schematic front view of the heating module of FIG. 3.

For this purpose it is proposed, according to the invention, to use a heating device 32 which is shown schematically in FIGS. 2 to 4 and which functions largely by means of near infrared thermal radiation. The heating device 32 comprises at least one heating module 34 which is borne by one of the wagons 16 of the work train 4. Each heating module is made up of at least one, and preferably, as shown in FIG. 3, at least two, heating units 36, defining a longilineal heating zone 28 which is located at a distance from the track and is oriented in an advance direction 200, preferably in parallel with the laying direction 100 of the work train 4. The heating zone 28 is open at a front end 38 and at a rear end 40 so as to allow for a portion of the rail 12 to penetrate through one end 38 and to reemerge through the other 40. The two heating units 36 are arranged one behind the other along the heating zone, and each surrounds the heating zone 28, at least in part.

Each heating unit 36 comprises a plurality of infrared radiation electric lamps 42 which are distributed around the periphery of the heating zone 28 and oriented towards the heating zone 28. Each of the electric lamps 42 comprises a tube 44 which is oriented in parallel with the advance direction 200 and encloses at least one filament 46. The filament 46 constitutes a radiation source which is capable of emitting near infrared radiation, having a maximum power spectral density for a wavelength of less than 2 μm, preferably less than 1.4 μm, very preferably less than 1.2 μm. An inside concave face of the tube is covered with a highly reflective material, forming a first reflector 48 which is oriented so as to reflect the radiation emitted by the radiation source 46 towards the heating zone 28, the filament or filaments 46 being arranged between the primary reflector 48 and the heating zone 28, directly opposite the heating zone 28. In a cross section through a plane perpendicular to the advance direction, the primary reflector may have a constant radius of curvature. However, according to different embodiments, a reflector having a profile that is parabolic, elliptical, or multifocal, in a cross section through a plane perpendicular to the advance direction 200, may be used. The filament 46 thus preferably passes through the focus of the parabola or the ellipse.

The infrared radiation electric lamps 42 are joined or arranged at a distance from one another, and each extend in parallel with the advance direction 200. Each heating unit 36 further comprises a secondary reflector 50 which has a concave cylindrical reflective surface made of polished aluminum, which surface surrounds the heating zone 28 and the infrared radiation electric lamps 42. The secondary reflector 50 may be a complete cylinder which entirely surrounds the heating zone 28. Alternatively, if it is desirable to retain access to the rail for the guidance thereof, said reflector may be a cylinder portion which covers an angle ϕ of more than 180°, and preferably more than 240°, in a sectional plane perpendicular to the advance direction 200. The radius of curvature of the secondary reflector 50 in a sectional plane perpendicular to the advance direction is preferably between 70 mm and 160 mm. The length of the infrared radiation electric lamps 42 and of the secondary reflector 50, measured in parallel with the advance direction 200, is preferably greater than 80 cm.

Guide means 52 are provided at the inlet 38 and at the outlet 40 of the heating zone 28 of the heating device, in order to ensure the guidance of the rail 12 in the heating zone 28. In this preferred embodiment, the portion of the rail 12 passing through the heating zone 28 is raised, i.e. located vertically at a distance above the final position thereof at the end of the laying process. The heating module 34 can itself be provided with one or more actuators 54 or a passive positioning mechanism in order to ensure the correct positioning thereof with respect to the rail 12, and to compensate the positioning variations of the transport vehicle 16 of the heating units 36 with respect to the desired trajectory of the track. The guide means 52 preferably include rollers which roll on the rail 12 and, if applicable, support the heating module 34.

Temperature sensors 56 are positioned at the inlet 38 of the heating zone 28, inside the heating zone 28, and at the outlet 40 of the heating zone 28, and, if applicable, directly in the vicinity of the fixing zone 30. Said temperature sensors 56 are connected to a control unit 58, shown in FIG. 5, which receives signals of other sensors 60, for example: a speed sensor of the transport vehicle 16 of the heating units 36, a speed sensor of the rail to be fixed, an ambient temperature sensor, an atmospheric pressure sensor, and/or an ambient humidity sensor. The control unit 58 is thus capable of measuring, estimating or calculating one or more of the following parameters: a temperature of the portion of the rail to be fixed prior to heating, a temperature of the portion of the rail to be fixed after heating, a temperature of the portion of the rail to be fixed during heating, an external ambient temperature, a movement speed of the transport vehicle of the heating units 16, a movement speed of the rail with respect to the heating device, an amount of heat transmitted to the portion of the rail by the heating device.

Furthermore, the control unit 58 contains, in a memory, a setpoint temperature which may have been acquired or programmed, and is representative of the "pre-neutralization" of "neutralization" temperature sought in the fixing zone 30, which makes it possible, if applicable, to determine a deviation between the setpoint temperature and a measured temperature of the portion of the rail to be fixed before heating, a deviation between the setpoint temperature and a measured temperature of the portion of the rail to be fixed after heating, or a deviation between the setpoint temperature and a measured temperature of the portion of the rail to be fixed during heating.

Finally, the control unit 58 is connected to a power source (voltage source or alternating or continuous current source) 62 which is associated with a modulation device 64 for modulating the electrical supply power of the infrared radiation electric lamps 42.

It is thus possible to modulate the electric power of each infrared radiation electric lamp 42 in a relatively continuous manner, over a range around a nominal value, for example between 10% and 100% of the maximum value, varying the amplitude and/or the frequency of the current and/or of the supply voltage in the region of the modulation device 58. Outside of this modulation range, larger variations can be obtained by completely extinguishing some lamps 42, or indeed a complete heating unit 36.

When the transport vehicle 16 of the heating units 36 advances in a laying direction 100, the rail to be fixed 12 moves, with respect to the heating device 28, in the opposite direction, and is guided such that, at every moment, a raised portion of the rail to be fixed 12 passes through the heating zone 28. If applicable, the positioning of the heating module 34 is adjusted by means of actuators 54 or a positioning mechanism. It is ensured that the infrared radiation electric lamps 42 are close to the portion of the rail to be fixed 12, preferably at a distance of less than 20 cm, preferably less than 10 cm, but without contact.

It is thus ensured that, at each moment and depending on the advancement of the transport vehicle 16 of the heating units 36, a portion of the rail to be fixed 12 passes through the heating zone 28, where it is heated by the heating unit 36 before re-emerging from the heating zone 28 and being conveyed towards the fixing zone 30 where it is laid on a crosstie 10 of the railroad track.

The control unit 54 determines, by means of a calculation algorithm, on the basis of all or some of the parameters discussed above, the number of infrared radiation electric lamps 42 and/or the electrical power required for heating the rail to be fixed 12.

By concentrating the infrared radiation in near infrared in order to be located in a region of high absorption of the radiation by the rail, and arranging the secondary reflector so as to reflect at least 50% of the non-absorbed radiation towards the heating zone, the output of the device is increased considerably. By arranging the infrared radiation lamps at a short distance from the central axis of the heating zone, and around the heating zone, the transfer of heat by convection is limited.

The movement of the transport vehicle of the heating units in the laying direction preferably takes place without stopping, at a speed that is in practice greater than 30 mm/s, preferably greater than 100 mm/s.

Of course, the examples shown in the drawings and discussed above are given merely by way of example and are non-limiting.

Each of the electric lamps may comprise more than one filament. It is in particular possible to use infrared radiation electric lamps referred to as twinned, comprising two adjoined tubes and a shared primary reflector, as shown in FIG. 6.

The secondary reflector may be located at the same distance from the central axis of the heating zone as the lamps, and extend between the lamps so as to form, together with the primary reflectors, a quasi-continuous reflective surface, from which the radiation cannot escape. For this purpose, it is possible to provide a secondary reflector 50 the wall of which is provided with cutouts 150 for fitting the infrared radiation electric lamps 42, as shown in FIG. 7. Alternatively, it is possible to provide a secondary reflector 50, the wall of which is provided with recesses 250 which are formed by for example by stamping and are intended for accommodating the infrared radiation electric lamps 42, as shown in FIG. 8.

The number of infrared radiation electric lamps 42 and the positioning thereof in each heating unit 36 may vary. It is in particular possible to take advantage of the uprising of the portion of the rail 12 passing through the heating zone 28 in order to orient at least a portion of the thermal radiation so as to reach the lower face of the rail, as shown in FIGS. 7 and 8. It is also advantageous to have a plurality of heating units 36 arranged in a row in the longitudinal advance direction of the vehicle, as shown in FIG. 3, or indeed a plurality of heating modules 34, as shown in FIG. 2, in order to allow for progressive heating, in a plurality of stages, or to achieve a greater heating power. The heating modules 34 located in a row may be directly adjacent or separated by an isothermal isolation portion. They may also be separated by a portion in the open air.

The transport vehicle of the heating module may be formed by a wagon 16 of the work train 4. It may also be an autonomous vehicle on wheels or caterpillar tracks which advance on the track.

If applicable, it is possible for only some of the infrared radiation electric lamps 42 to be equipped with a modulation device 64.

It is also possible to provide for the modulation devices 64 not to be proportional, but to function in "all-or-nothing" operation, in order to turn off or on the infrared radiation electric lamps 42 in a number corresponding to the requirements. It is also possible to provide for a pulsed operating mode, in which some of the infrared radiation electric lamps 42 are illuminated intermittently. It is also possible to provide for hinging the heating units 36 so as to be able to quickly move them away from the heating zone 28 when it is desirable to reduce the amount of heat transmitted to the rail to be laid 12.

Due to the very rapid response time of the infrared radiation electric lamps 42, it is possible to implement the method according to the invention not only for thermal pre-neutralization, but also for direct fine thermal neutralization.

The advance direction 200 of the rail 12 in the heating zone 28 may be slightly inclined with respect to the laying direction 100, while remaining largely in parallel with a vertical longitudinal plane.

In a variant, the heating operation for the rail to be fixed 12 may take place while the rail to be fixed 12 is already laid on the crossties.

The mode of heating of the rails which has been described above for a railroad track renovation, replacing rails, also applies for a track renovation replacing old rails, or for first laying.

The invention claimed is:

1. A mobile device for heating a rail of a railroad track, comprising: at least one heating module comprising at least one heating zone and at least one radiating heat source which is oriented towards the heating zone; and a transport vehicle for transporting the heating module, the transport vehicle being provided with means for raising the portion of the rail located in the heating zone with respect to the railroad track, whereby the transport vehicle is capable of travelling along a railroad track in a laying direction, such that, at each moment, a portion of the rail of the railroad track not fixed to a crosstie of the railroad track is raised with respect to the railroad track and passes through the heating zone in an advance direction; the heating module comprising at least one heating unit, wherein the heating unit comprises a plurality of infrared radiation electric lamps which are distributed over the periphery of the heating zone and are oriented towards the heating zone, each of the infrared radiation electric lamps comprising at least one radiation source which is capable of emitting infrared radiation having a maximum power spectral density for a wavelength of less than 2 μm, and at least one primary reflector which is oriented so as to reflect the infrared radiation emitted by the radiation source towards the heating zone, the radiation source being arranged between the primary reflector and the heating zone, directly opposite the heating zone, the heating unit further comprising a secondary reflector having a concave reflective surface surrounding the infrared radiation electric lamps and the heating zone, and capable of returning reflected rays, passing between the infrared radiation electric lamps, towards the heating zone with a reflectance greater than 80% in the spectral range of between 0.5 and 2 μm, wherein, in a cross section through a plane perpendicular to the advance direction, the reflective surface of the secondary reflector has a cross section in the shape of a circular arc having an angle of 180° or more centered on the heating zone, or a circular cross section, and a radius of curvature that is less than 160 mm and greater than 70 mm.

2. The mobile heating device of claim 1, wherein the infrared radiation electric lamps are tubular and are oriented so as to be in parallel with the advance direction.

3. The mobile heating device of claim 1, wherein said radius of curvature of the reflective surface of the secondary reflector is less than 120 mm.

4. The mobile heating device of claim 1, wherein the reflective surface of the secondary reflector is made of polished aluminum, silver, or gold.

5. The mobile heating device of claim 1, wherein the primary reflector of each of the infrared radiation electric lamps is parabolic or in the shape of an elliptical or circular arc in a cross section in a sectional plane perpendicular to the advance direction.

6. The mobile heating device of claim 1, wherein the maximum power spectral density is observed for a wavelength of greater than 0.7 μm.

7. The mobile heating device of claim 1, wherein the number of infrared radiation electric lamps is greater than 4.

8. The mobile heating device of claim 1, wherein the transport vehicle of the heating module comprises means for positioning the portion of the rail, following heat input, on a crosstie of the railroad track and for fixing the portion of the rail on the crosstie.

9. The mobile heating device of claim 1, wherein the heating module comprises at least two heating units which are aligned in the advance direction in order to define the heating zone.

10. The mobile heating device of claim 1, wherein the heating module is provided with rollers which roll on the portion of the rail for ensuring the guidance of the portion of the rail in the heating zone of the guided heating module.

11. The mobile heating device of claim 1, wherein the radiation source is capable of emitting infrared radiation having a maximum power spectral density for a wavelength of less than 1.4 μm.

12. A mobile device for heating a rail of a railroad track, comprising: at least one heating module comprising at least one heating zone and at least one radiating heat source which is oriented towards the heating zone; and a transport vehicle for transporting the heating module, the transport vehicle being provided with means for raising the portion of the rail located in the heating zone with respect to the railroad track, whereby the transport vehicle is capable of travelling along a railroad track in a laying direction, such that, at each moment, a portion of the rail of the railroad track not fixed to a crosstie of the railroad track is raised with respect to the railroad track and passes through the heating zone in an advance direction; the heating module comprising at least one heating unit, wherein the heating unit comprises a plurality of infrared radiation electric lamps which are distributed over the periphery of the heating zone and are oriented towards the heating zone, each of the infrared radiation electric lamps comprising at least one radiation source which is capable of emitting infrared radiation having a maximum power spectral density for a wavelength of less than 2 μm, and at least one primary reflector which is oriented so as to reflect the infrared radiation emitted by the radiation source towards the heating zone, the radiation source being arranged between the primary reflector and the heating zone, directly opposite the heating zone, the heating unit further comprising a secondary reflector having a concave reflective surface surrounding the heating zone, and capable of returning reflected rays, passing between the infrared radiation electric lamps, towards the heating zone with a reflectance greater than 80% in the spectral range of between 0.5 and 2 μm, wherein, in a cross section through a plane perpendicular to the advance direction, the reflective surface of the secondary reflector has a cross section in the shape of a circular arc having an angle of 180° or more centered on the heating zone, or a circular cross section, and a radius of curvature that is less than 160 mm and greater than 70 mm, and wherein the secondary reflector is provided with cutouts or stampings for accommodating the infrared radiation electric lamps, such that the secondary reflector extends between the infrared radiation electric lamps.

13. The mobile heating device of claim 12, wherein the infrared radiation electric lamps are tubular and are oriented so as to be in parallel with the advance direction.

14. The mobile heating device of claim 12, wherein said radius of curvature of the reflective surface of the secondary reflector is less than 120 mm.

15. The mobile heating device of claim 12, wherein the reflective surface of the secondary reflector is made of polished aluminum, silver, or gold.

16. The mobile heating device of claim 12, wherein the primary reflector of each of the infrared radiation electric lamps is parabolic or in the shape of an elliptical or circular arc in a cross section in a sectional plane perpendicular to the advance direction.

17. The mobile heating device of claim 12, wherein the maximum power spectral density is observed for a wavelength of greater than 0.7 μm.

18. The mobile heating device of claim 12, wherein the number of infrared radiation electric lamps is greater than 4.

19. The mobile heating device of claim 12, wherein the transport vehicle of the heating module comprises means for positioning the portion of the rail, following heat input, on a crosstie of the railroad track and for fixing the portion of the rail on the crosstie.

20. The mobile heating device of claim 12, wherein the heating module comprises at least two heating units which are aligned in the advance direction in order to define the heating zone.

21. The mobile heating device of claim 12, wherein the heating module is provided with rollers which roll on the portion of the rail for ensuring the guidance of the portion of the rail in the heating zone of the guided heating module.

22. The mobile heating device of claim 12, wherein the radiation source is capable of emitting infrared radiation having a maximum power spectral density for a wavelength of less than 1.4 μm.

* * * * *